United States Patent [19]

Wirkestrand

[11] Patent Number: 5,774,469
[45] Date of Patent: Jun. 30, 1998

[54] COMBINED MINICELL ALIGNMENT AND HEADER PROTECTION METHOD AND APPARATUS

[75] Inventor: Anders Wirkestrand, Stockholm, Sweden

[73] Assignee: Telefonaktiebolaget LM Ericsson, Stockholm, Sweden

[21] Appl. No.: 626,000

[22] Filed: Apr. 1, 1996

[51] Int. Cl.$^6$ .................................................. H04J 3/24
[52] U.S. Cl. .................................................. 370/473
[58] Field of Search ................................... 370/472, 473, 370/474, 476, 477, 465, 470, 471; 371/48, 37.7

[56] References Cited

U.S. PATENT DOCUMENTS

| 5,020,055 | 5/1991 | May, Jr. ................................. 370/474 |
| 5,333,135 | 7/1994 | Wendort ................................. 370/474 |
| 5,396,490 | 3/1995 | White et al. ........................... 370/474 |
| 5,440,545 | 8/1995 | Buchholz et al. ..................... 370/474 |
| 5,606,558 | 2/1997 | Daniel et al. ......................... 370/474 |

OTHER PUBLICATIONS

H. Tsuboya, "ATM for Low Bit Rate Voice", ATM–Forum 95/1286, Oct., 1995.
T. Ishihara, "Proposal of Short Cell Format for Low Bit Rate Voice", ATM–Forum/95–1478, Dec. 1995.
T. Okutani et al., "Transport Compressed Voice in ATM Trunking", ATM–Forum/95–1626, Dec. 1995.
G. Eneroth, "Use of ATM in Cellular Networks", ATM–Forum/95–1642, Dec. 1995.
"An AAL for Transporting Short Multiplexed Packets (SMAAL)", T1S1.5/95–001 Revision 1, Dec. 1995.

Primary Examiner—Ajit Patel
Attorney, Agent, or Firm—Burns, Doane, Swecker & Mathis, L.L.P.

[57] ABSTRACT

In a telecommunication system that uses asynchronous transfer mode (ATM) protocol as a data transfer infrastructure, minicell header information is checked, minicell alignment is maintained, and ATM bandwidth utilization is improved by inserting only one header integrity check code into each ATM cell rather than a header integrity check code for each and every minicell header. The one header integrity check code is determined from a combination of minicell headers stored in the ATM cell.

14 Claims, 7 Drawing Sheets

COMBINED MINICELL ALIGNMENT AND HEADER PROTECTION METHOD AND APPARATUS

BACKGROUND

The present invention relates to the transmission of telecommunication data, and more particularly to the transmission of telecommunications data using the Asynchronous Transfer Mode (ATM) protocol. More specifically, the present invention relates to an efficient method and apparatus for computing, storing, and utilizing a single header integrity check code common to all non-standard short cells, referred to as minicells, multiplexed into an ATM cell.

Asynchronous Transfer Mode (ATM) is a standard protocol for transmitting telecommunication data within a telecommunication system (e.g., cellular telecommunication network). Data is transmitted in fixed-size packets called ATM cells. Each ATM cell contains a 48 octet payload and a 5 octet header. ATM is well known in the art and is commonly used for high bit rate applications (e.g., multimedia communication); however, ATM can be used to significantly improve the efficiency of low bit rate applications (e.g., cellular voice communication) as well.

Figure 1:
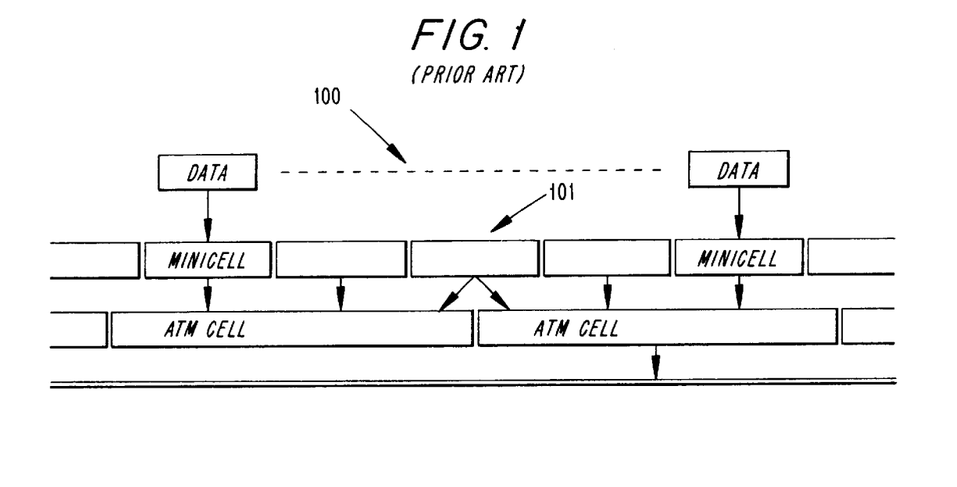
FIG. 1 is a diagram illustrating the prior art process of multiplexing minicells into the ATM cell flow.

When using ATM for low bit rate communication, such as cellular voice communication, it is often advantageous to multiplex small packets of compressed data into the ATM cell stream as illustrated by process 100 in FIG. 1. These small packets are often referred to as "minicells". Minicells, though typically shorter than ATM cells, are similar in the sense that they also contain a header, usually 2 octets in length, and a payload with a fixed or variable length. In fact, minicells can stretch over ATM cell borders as illustrated by minicell 101 in FIG. 1. By multiplexing minicells into the ATM stream, bandwidth (BW) utilization is improved and transmission costs are reduced when the minicells are, in general, smaller than the ATM cells.

Figure 2:
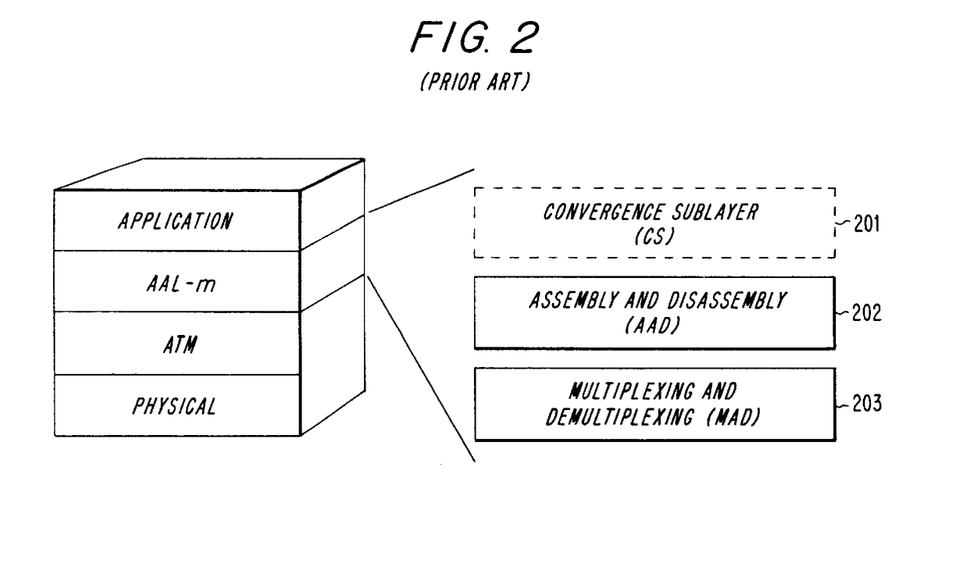
FIG. 2 is a diagram showing the prior art layered protocol model for AALm.

In a layered communications system, the mechanism for processing this additional layer of cells, or minicells, is referred to as an ATM Adaption Layer or AALm, where "m" stands for "minicell". This additional process or "layer" can be further subdivided into three sublayers as illustrated in FIG. 2. The convergence sublayer 201 allows the AALm to interface with the telecommunication application. The assembly and disassembly sublayer 202 inserts and extracts user data (e.g., voice communication data) into and out of each minicell (see also FIG. 1). The multiplexing and demultiplexing sublayer 203 inserts and extracts minicells into and out of the ATM cells (see also FIG. 1).

A telecommunication system that employs ATM and AALm must address two basic concerns. First, it must insure the correctness of the header information in each minicell. Second, it must be capable of maintaining minicell alignment, that is determining where each minicell starts and ends within an ATM cell.

Figure 3:
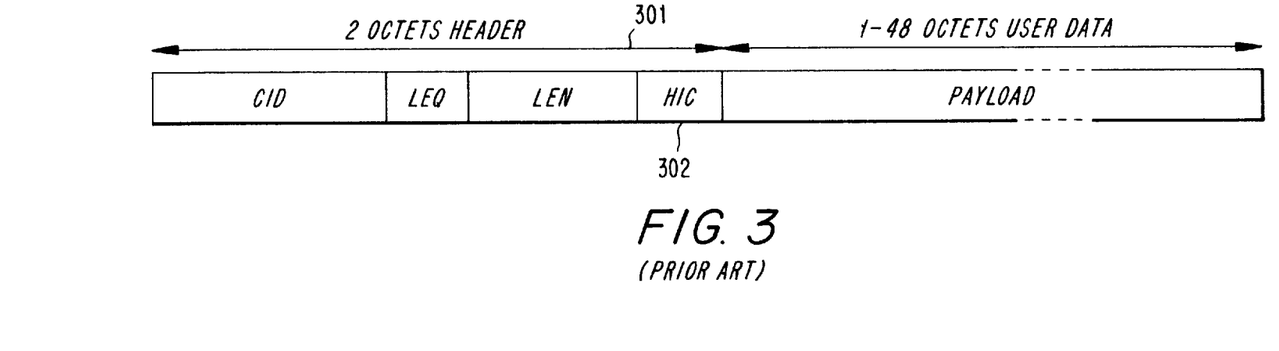
FIG. 3 is a diagram depicting the basic format of a minicell in the prior art.
Figure 4:
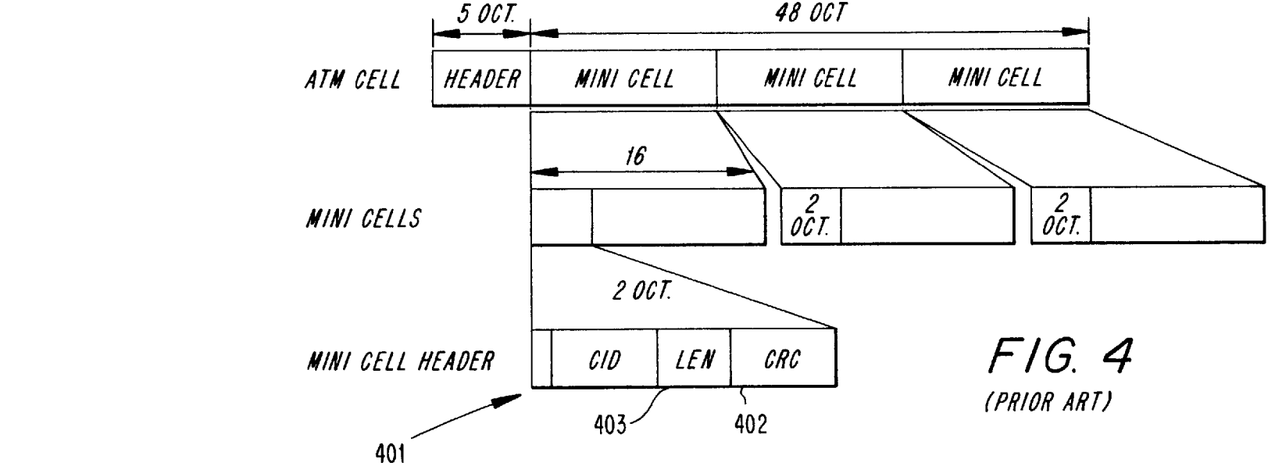
FIG. 4 is diagram illustrating the physical relationship between a minicell, the minicell header, and the ATM cell in the prior art.

To insure the correctness of minicell header information, state of the art methods typically employ some kind of minicell header integrity check (HIC). These checks help detect and, in some cases, correct errors in the minicell header information. This can easily be accomplished by including an error detection/error correction code in the header of every minicell. This technique is well known in the art. For example, Göran Eneroth et al., "Minicell Protocol (AALm) for Low Bit Rate Applications," (February 1996), employs a two octet minicell header 301 in each and every minicell, as illustrated in FIG. 3. The minicell header 301 includes a two bit HIC code 302. The two bit HIC code maintains the integrity of the header information with a two bit interleaved parity check. In another example, illustrated in FIG. 4, Tomohiro Ishihara, "Proposal of Short Cell Format for Low Bit Rate Voice," (December 1995), employs a two octet minicell header 401 in each and every minicell, where each header includes an HIC error detection/error correction code 402. In this example, the HIC code is a five bit cyclic redundancy code (CRC) that is capable of three bit error correction and two bit error detection.

Despite the general efficiency of the AALm technique, the state of the art methods employed to insure correctness of the minicell header information are not efficient. The primary reason is that every minicell header must dedicate several bits to perform the header integrity check, and this occupies valuable bandwidth. The inefficiency is even more severe when the minicell payloads are short.

Figure 5:
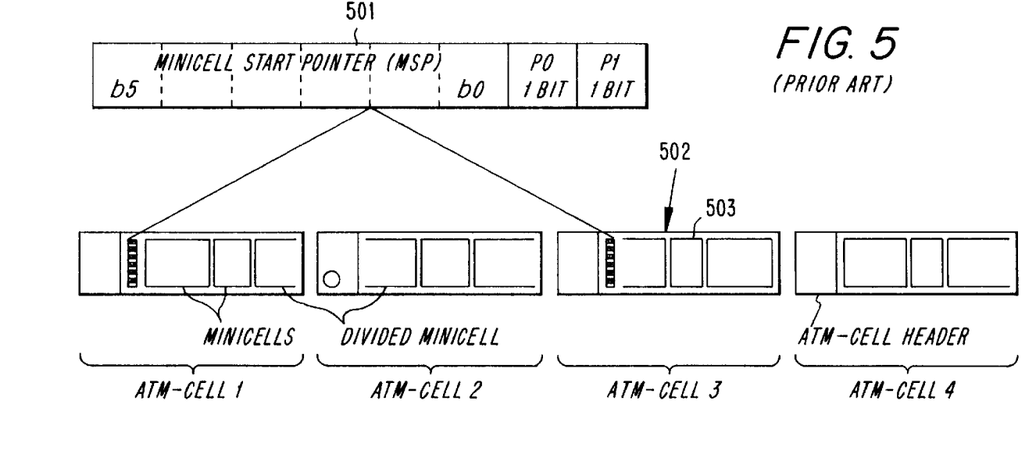
FIG. 5 is a diagram showing a prior art alignment method with a minicell start pointer in every other ATM cell.

As mentioned above, the second concern is maintaining proper minicell alignment. FIG. 5 illustrates how prior art methods typically handle minicell alignment. As shown in FIG. 5, most state of the art methods employ a minicell start pointer (MSP) 501 at the beginning of certain ATM cells as illustrated in FIG. 5. The MSP 501 identifies the starting location (octet) 502 of the first complete minicell within the ATM cell 503. The MSP 501 is typically six bits in length, so that it can identify any of the 48 octets which make up the standard ATM payload. A two bit extension is also provided for checking parity. In addition, each minicell header contains a length indicator field (see FIG. 4, reference no. 403), also having a length of six bits, which identifies the length of the corresponding minicell in terms of the number of octets that make up the minicell payload. Between each MSP 501, alignment is maintained by identifying the location of the first complete minicell in accordance with MSP 501 and, thereafter, counting the octets which make up the payload of each minicell in accordance with the value represented by the length indicator in each minicell header.

Like the HIC code, the MSP 501 takes up valuable bandwidth. If each ATM cell contains an MSP 501, effective bandwidth is decreased by approximately 2%. If an MSP 501 is included in every sixteenth ATM cell, the amount of wasted bandwidth is almost reduced to zero. If, in either case, alignment is lost for any reason, for example, due to excessive noise on the transmission lines, alignment cannot be regained until the next MSP 501, if correctly received, and all of the minicells in between will be lost.

Therefore, despite the improvement over standard ATM, methods which employ AALm need to further improve bandwidth utilization by increasing the efficiency of the HIC and minicell alignment.

SUMMARY

It is an object of the invention to provide a more efficient method and means for insuring correct minicell header information.

It is another object of the invention to provide a more efficient method and means for maintaining minicell alignment.

It is yet another object of the invention to provide a more efficient method and means for insuring correct minicell header information and maintaining minicell alignment while improving bandwidth utilization.

In accordance with one aspect of the present invention, the foregoing and other objects are achieved in a telecommunication system with a method and/or an apparatus for generating a data packet (e.g., an ATM cell) comprising the steps of generating at least one minicell, wherein each minicell comprises a user data portion (e.g., a payload) and a header; then inserting at least part of the at least one minicell into the data packet; then generating a header integrity check trailer code from a combination code, wherein the combination code comprises the header from each of the minicells that were inserted into the data packet; and then inserting the header integrity check trailer code into the data packet.

In accordance with another aspect of the invention, a method and/or an apparatus for determining the integrity of minicell headers in a data packet includes identifying every minicell header in the data packet; then determining a header integrity check code that is based on the extracted minicell headers; then identifying a stored header integrity check trailer code from the data packet; then comparing the stored header integrity check code with the determined header integrity check trailer code; and finally, using a result of the comparison to determine the integrity of every minicell header in the data packet.

In accordance with yet another embodiment of the invention, a method and/or apparatus for maintaining minicell alignment in a data packet includes defining a starting location for a first complete minicell in the data packet; then identifying a first guess header from every minicell in the data packet based on the defined starting location of the first complete minicell in the data packet; then determining a header integrity check code that is based on every identified first guess minicell header; then identifying a stored header integrity check trailer code from the data packet; then comparing the determined header integrity check code with the stored header integrity check trailer code; and finally, using a result of the comparison to determine whether the receiver is synchronized to the minicells in the data packet.

BRIEF DESCRIPTION OF THE DRAWINGS

The objects and advantages of the invention will be understood by reading the following detailed description in conjunction with the drawings in which.

DETAILED DESCRIPTION

The present invention provides a more efficient method and means to perform a header integrity check (HIC) for each minicell header in an ATM cell. The invention also provides a more efficient method and means to maintain minicell alignment. In one embodiment of the invention, this is accomplished by adding a single HIC code in some easily identified part of the ATM cell in lieu of an HIC code in each and every minicell header. The single HIC code word will be based on the combined data in each of the minicell headers in the corresponding ATM cell. Therefore, the single HIC code will be common to all of the minicell headers in the ATM cell.

Figure 6:
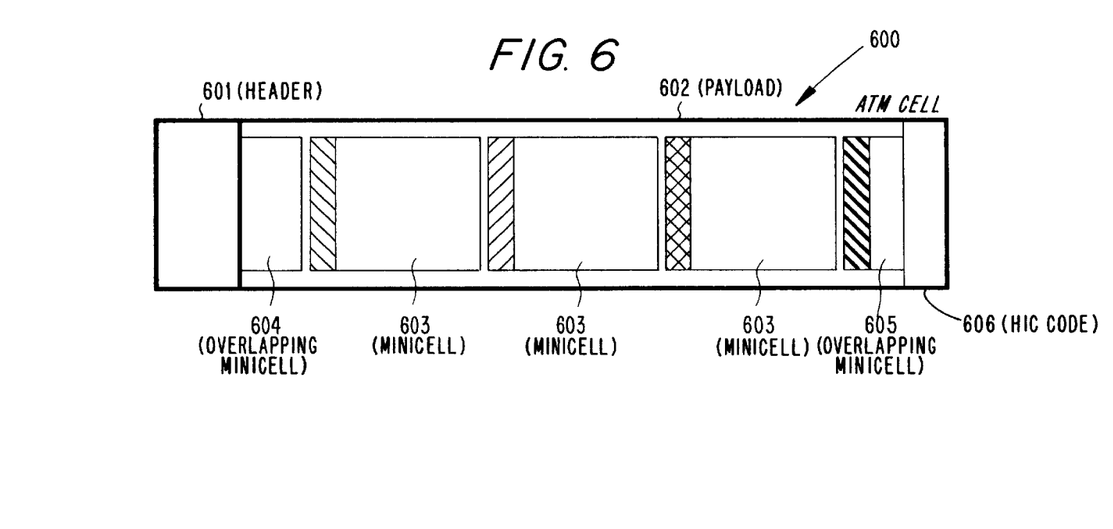
FIG. 6 is a diagram illustrating minicells mapped into an ATM cell and the HIC-trailer code occupying the last octet of the ATM cell.

FIG. 6 illustrates an ATM cell 600 having an ATM cell header 601 that is five octets in length and an ATM cell payload 602 that is 48 octets in length. In accordance with the AALm technique described above, minicells 603 are multiplexed into the ATM cell 600. The minicells 603 can, as shown, vary in length and stretch from one ATM cell to the next as illustrated by minicells 604 and 605. The difference between ATM cell 600 and ATM cells employed in the prior art methods is that ATM cell 600 includes an HIC code 606, referred to hereinbelow as the HIC-trailer code. In a preferred embodiment of the invention, the HIC-trailer code 606 is one octet in length and is located in the last octet of ATM cell 600. Of course, the length and location of the HIC-trailer code could be different in alternative embodiments without departing from the teachings of the invention. As stated above, the inclusion of HIC-trailer code 606 replaces the prior art practice of placing an HIC code in each and every minicell header. This makes the present invention more efficient in terms of bandwidth utilization when the minicells are, in general, smaller than the ATM cells.

Once the HIC-trailer code 606 is derived and inserted into the ATM cell, it can be used for minicell header error detection and correction in much the same way that ATM and minicell codes are presently used for detecting and correcting errors in ATM cell headers and in each individual minicell header, respectively. In general, the transmission source will compute the HIC-trailer code based on the contents of each minicell header in the corresponding ATM cell and insert the result into an easily identified part of the ATM cell as described above.

In one embodiment of the invention, the HIC-trailer code can be based on the properties of cyclic codes (e.g., cyclic redundancy codes). In this embodiment, the HIC-trailer code 606 is computed by first concatenating the header information from all minicells in the corresponding ATM cell.

Figure 7:
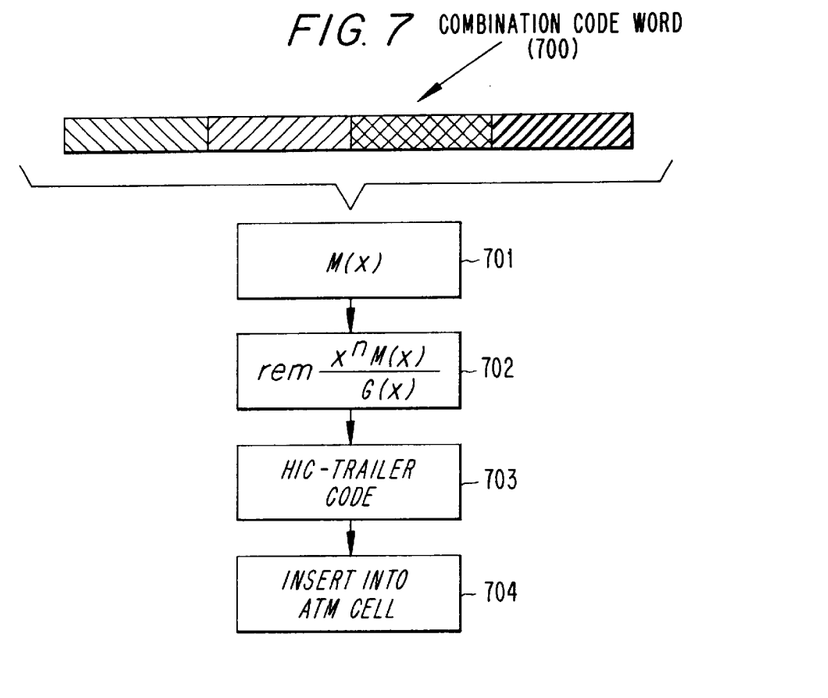
FIG. 7 is a diagram depicting the calculation of the HIC-trailer code based on a concatenation of each minicell header in the ATM cell.

Those skilled in the art will recognize that this may be accomplished by physically creating a new code word that comprises the concatenated headers copied from each minicell in the corresponding ATM cell. Alternatively, the headers from each minicell in the corresponding ATM cell may be processed without the need for physically constructing a new code word. Throughout this specification, the term "combination code" will be used to designate either alternative. For example, FIG. 7 illustrates the combination code word 700 resulting from the concatenation of minicell headers corresponding to minicells 603 and 605 in ATM cell 600. Combination code word 700 can then be represented by a polynomial M(x) of degree m−1, where m represents the number of elements or bits in combination code word 700. For example, if code word 700 is 100101, it can be represented by a polynomial $M(x)=x^5+x^2+1$, where the values of each element (i.e., bit) are used as coefficients for polynomial M(x). The HIC-trailer code 606 is then computed as the remainder of $x^n M(x)/G(x)$, where $G(x)$ is a generator polynomial of degree n.

As stated above, the HIC-trailer code 606 is computed as the remainder of $x^n M(x)/G(x)$ and is then inserted into an easily identified part of the ATM cell (e.g., the last octet) and transmitted with the rest of the ATM cell to a receiving entity. A receiver, in the receiving entity, then recomputes the cyclic code based on the minicell header information actually received. If the computed cyclic code matches the HIC-trailer value that was received, the header information for all of the received minicells is presumed to have been transmitted and received without error.

The calculation of HIC codes based on cyclic codes is well known in the art and is commonly used to perform header integrity checks for ATM cell headers as described in the International Telecommunication Union ITU-T, B-ISDN User-Network Interface-Physical Layer Specification, Recommendation I.432(1993), the contents of which are incorporated herein by reference.

Figure 8:
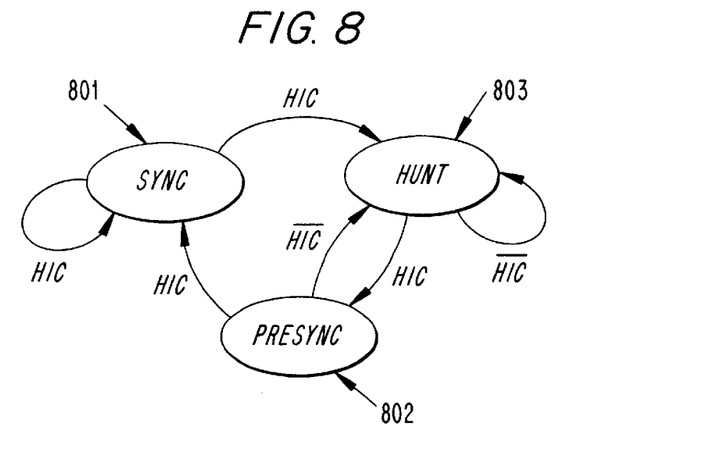
FIG. 8 is a state diagram illustrating receiver operation.

In another embodiment of the invention, the HIC-trailer code can be used for finding the minicell borders in an ATM cell after minicell alignment is lost. The receiver may use the HIC-trailer code in much the same way that it uses header error control (HEC) codes in the ATM cell headers to achieve ATM cell delineation as described in ITU Recommendation I.432, "B-ISDN User Network Interface—Physical Layer Specification," the contents of which are incorporated herein by reference. As illustrated in FIG. 8, the receiver operates in one of the following three states: the SYNC state 801, the PRESYNC state 802, or the HUNT state 803.

Figure 9:
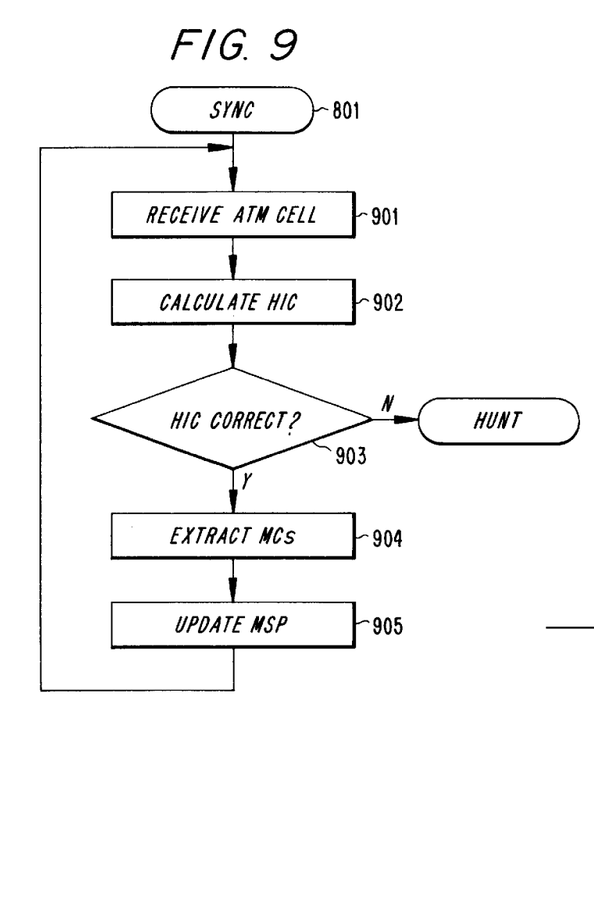
FIG. 9 is a flowchart depicting a strategy for the SYNC state receiver operation.

A flowchart of the SYNC state 801 is shown in FIG. 9. While in SYNC state 801, the receiver is presumed to know how to accurately locate the beginnings of each minicell within the ATM cell. The receiver, when in the SYNC state 801, will receive an ATM cell (from the transmission entity) as illustrated in block 901 and calculate an HIC-trailer code as illustrated in block 902 based on that which the receiver believes to be the header information from each minicell in the ATM cell as explained above. If for any reason, the receiver is not properly aligned with the minicell headers, the calculated HIC code will most likely be incorrect (i.e., will be different from the HIC-trailer code stored in the ATM cell by the sending entity). If the receiver incorrectly computes the HIC-trailer code, the possibility exists that the receiver has lost synchronization. Accordingly, the receiver transitions to the HUNT state 803 as illustrated by decision block 903. If, on the other hand, the HIC-trailer code is correctly computed, the receiver extracts each of the minicells, as illustrated in block 904, and delivers them to the minicell assembly and disassembly layer 202. The receiver then updates a minicell start pointer (MSP), as illustrated in block 905, which indicates the starting point of the first complete minicell in the next ATM cell to be received. Unlike prior art methods, the MSP is an internal variable and does not affect the bandwidth of the ATM connection.

Figure 10:
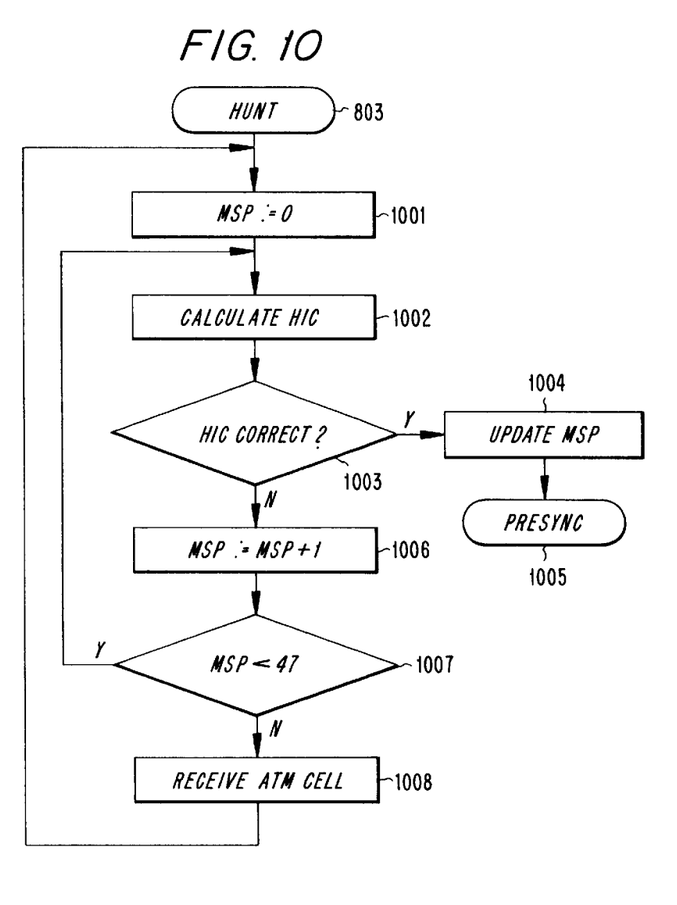
FIG. 10 is a flowchart depicting a strategy for the hunt state receiver operation.

As mentioned above, the receiver will transition to the HUNT state 803 if an incorrect HIC-trailer code is computed during the SYNC state. The incorrect HIC-trailer code computation may be due to a loss of minicell alignment, or bit errors in the minicell headers. The purpose of the HUNT state 803 is to reestablish alignment. While in the HUNT state 803, the receiver stops sending minicells to the assembly and disassembly layer 202 and it begins searching for the location of the first complete minicell in the ATM cell. The receiver accomplishes this by "guessing" the starting location of the first complete minicell. For purposes of illustration, the receiver might begin searching at the first octet (octet number zero) in the ATM cell as illustrated in block 1001 in FIG. 10, where the forty-eight octets in the ATM cell payload are shown numbered from zero to forty-seven. The receiver then calculates an HIC-trailer code, as illustrated in block 1002. If the receiver computes the correct HIC-trailer code, the receiver will update the MSP and transition from the HUNT state 803 to the PRESYNC state 802 as illustrated by decision block 1003 and blocks 1004 and 1005 respectively. As before, the MSP is an internal variable that contains the starting location of the first complete minicell in the next ATM cell to be received. If the receiver computes an incorrect HIC-trailer code, the receiver takes another guess as to the location of the first complete minicell in the ATM cell. The receiver accomplishes this by incrementing the MSP as illustrated in block 1006. The process will repeat itself until the receiver computes the correct HIC-trailer code or the receiver cycles through all forty-eight octets in the ATM cell payload without correctly calculating the HIC-trailer code. If the receiver checks all forty-eight octets in the ATM cell without correctly computing the HIC-trailer code, the receiver will receive the next ATM cell and begin anew as illustrated by decision block 1007 and block 1008.

Figure 11:
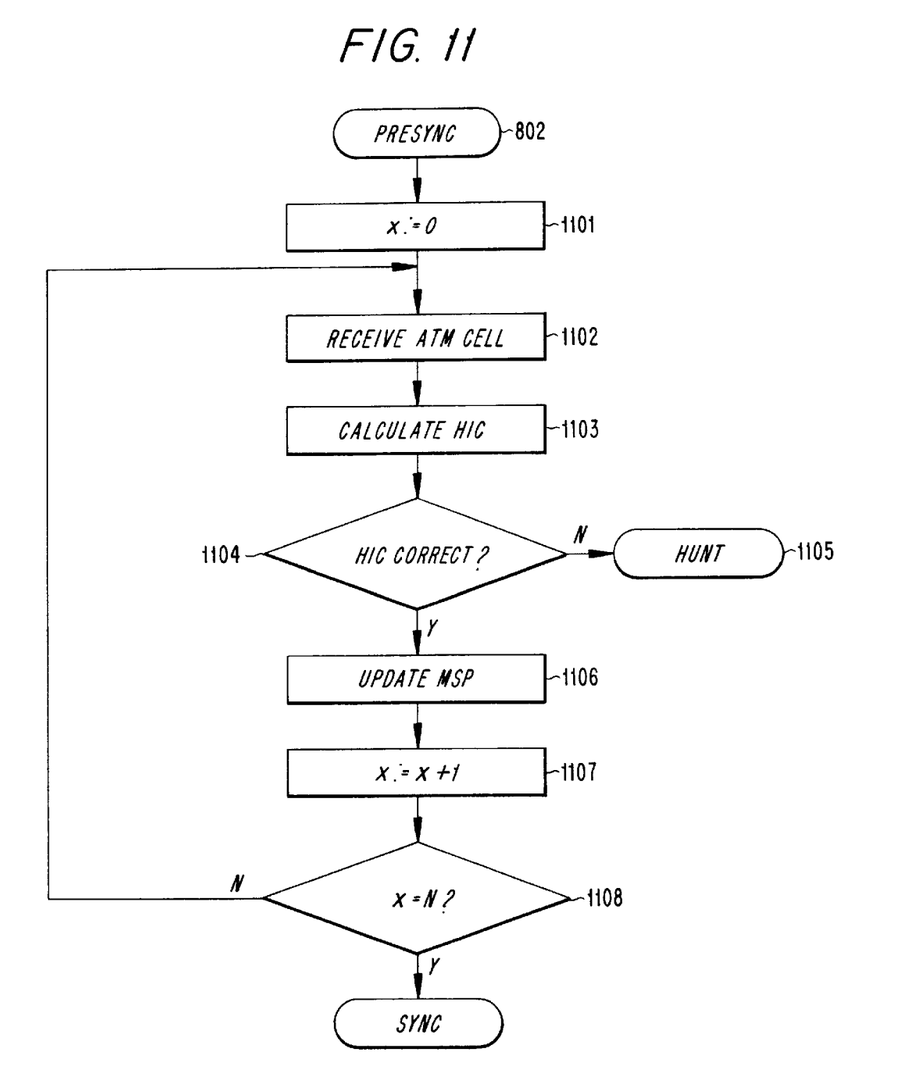
FIG. 11 is a flowchart depicting a strategy for the PRESYNC state receiver operation.

If the receiver correctly calculates the HIC-trailer code during the HUNT state 803, the receiver transitions from the HUNT state 803 to the PRESYNC state 802 on the presumption that minicell alignment has been re-established. The purpose of the PRESYNC state 802 is to insure that minicell alignment has been re-established by correctly computing the HIC-trailer code for the next N ATM cells as illustrated by FIG. 11. As stated, the receiver will transition from the HUNT state 803 to the PRESYNC state 802 if a correct HIC-trailer code is calculated. In the PRESYNC state 802, the receiver first initializes an internal counter, x, as illustrated in block 1101. Then, the next ATM cell is received and the HIC-trailer for that ATM cell is calculated, as illustrated by blocks 1102 and 1103. If the receiver calculates the incorrect HIC-trailer value, the receiver transitions back to the HUNT state 803 as illustrated by decision block 1104 and block 1105. However, if the receiver calculates the correct HIC-trailer code, the MSP is updated and the internal counter x is updated, as illustrated by blocks 1106 and 1107. If the receiver calculates the correct HIC-trailer code for N consecutive ATM cells, the receiver transitions from the PRESYNC state 802 to the SYNC state 801 as illustrated by decision block 1108. If a correct minicell starting point guess is confirmed by accurately calculating the HIC-trailer code for N+1 consecutive ATM cells (including the calculation during the HUNT state 803), the probability of delivering faulty minicells to the assembly and disassembly layer 202 is represented by:

$$\frac{1 - (1 - 2^{-n})^{48-b}}{2^{n(1+N)}}$$

where n represents the number of HIC-trailer code bits and b represents the number of octets occupied by the HIC-trailer code. For example, the probability of delivering any faulty minicells to the assembly and disassembly layer 202, for an 8 bit HIC and an N=1 receiver, is $2.6 * 10^{-6}$. This suggests that even after minicell alignment is lost, the probability of actually delivering a faulty minicell is very small.

In another embodiment of the invention, the receiver would be able to send the received minicells to the assembly and disassembly layer 202 while in the PRESYNC state 802. However, a control flag would be set to indicate that the minicells might be faulty. This gives the application the opportunity to discard or use the minicells received during the PRESYNC state 802.

Figure 12:
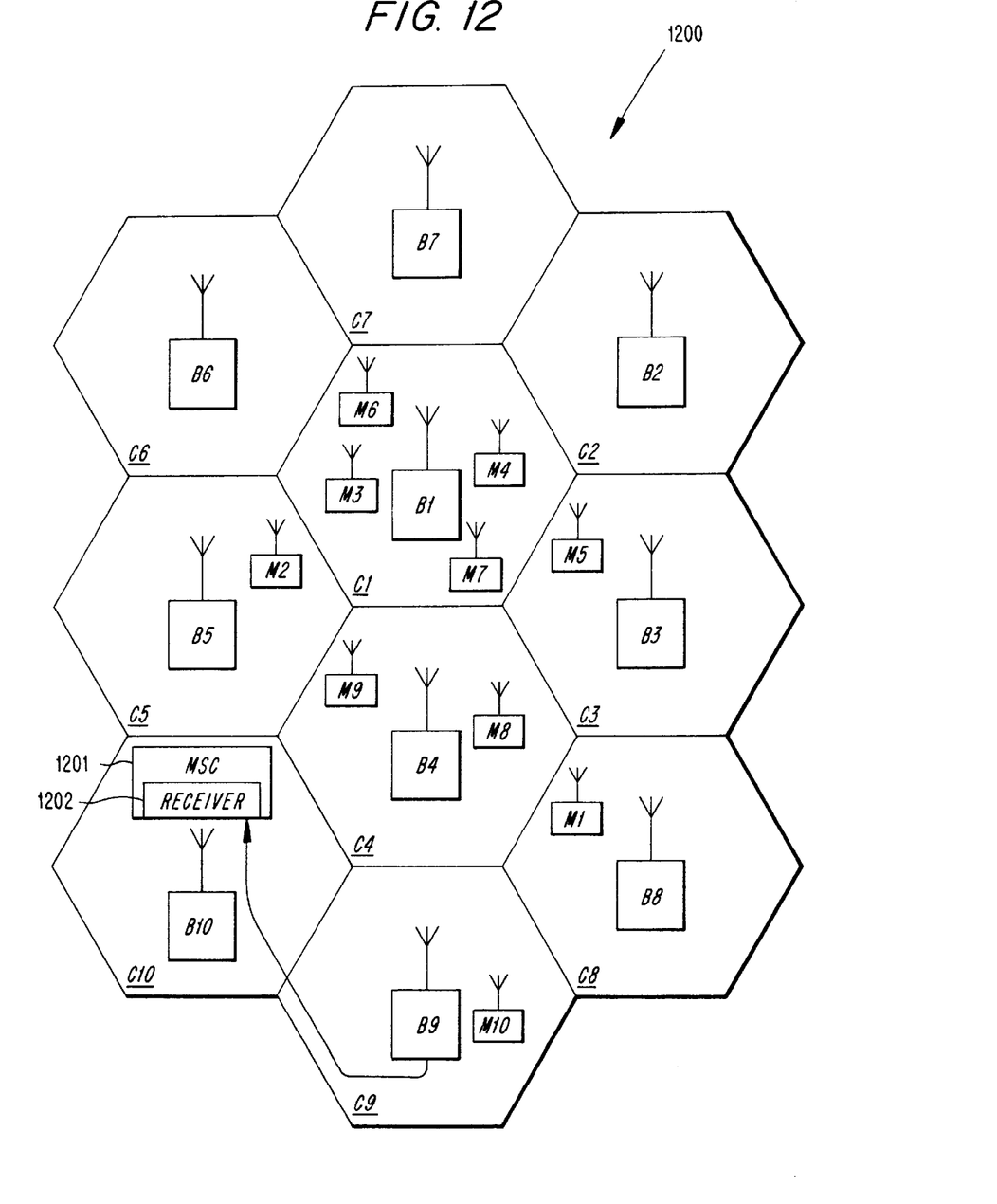
FIG. 12 is a diagram illustrating a typical prior art cellular telecommunication system (e.g., a cellular telephone system).

As stated above, the telecommunications application could, for example, be a cellular telephone system 1200 as illustrated in FIG. 12, where each radio cell C1–C10 is serviced by a corresponding one of a plurality of base stations B1–B10. Regarding the present invention, each base stations B1–B10 controls the transmission of user data (i.e., voice data) from the various mobile units M1–M10 to the mobile switching center (MSC) 1201. In general, the base stations B1–B10 each begin by compressing the user data into minicells as illustrated in FIG. 1. Each minicell contains a header. The base stations B1–B10 multiplex the minicells into ATM cells and insert a single HIC-trailer code into each ATM cell as illustrated by FIG. 6. The base stations B1–B10 compute each HIC-trailer code as illustrated by FIG. 7. The base stations B1–B10 then transmit the ATM cells to the MSC 1201. The MSC 1201 contains a receiver 1202 which uses the single, HIC-trailer codes to check the integrity of each minicell header and maintain minicell alignment in accordance with FIGS. 8–11.

The invention has been described with reference to a particular embodiment. However, it will be readily apparent to those skilled in the art that it is possible to embody the invention in specific forms other than those of the preferred embodiment described above. This may be done without departing for the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a telecommunication system, a method for generating a data packet comprising the steps of:

generating at least one minicell, wherein each minicell comprises a user data portion and a header;

inserting at least part of said at least one minicell into the data packet;

generating a header integrity check trailer code from a combination code, wherein the combination code comprises information contained in the header of each of the minicells that were inserted into the data packet; and inserting the header integrity check trailer code into the data packet.

2. The method of claim 1, wherein said step of inserting the header integrity check trailer code into the data packet comprises the step of:

inserting the header integrity check trailer code into a predetermined position in the data packet.

3. In a telecommunication system, a method for determining the integrity of minicell headers in a data packet comprising the steps of:

identifying every minicell header in the data packet;

determining a header integrity check code that is based on every identified minicell header;

identifying a stored header integrity check trailer code from the data packet;

comparing the stored header integrity check code with the determined header integrity check trailer code; and using a result of the comparison to determine the integrity of every minicell header in the data packet.

4. The method of claim 3, wherein said step of using a result from the comparison to determine the integrity of every minicell header in the data packet comprises the step of:

detecting and correcting errors in at least one minicell header in the data packet.

5. In a telecommunication system, a method for maintaining alignment of minicells in a data packet comprising the steps of:

defining a starting location for a first complete minicell in the data packet;

identifying a first guess header from every minicell in the data packet based on the defined starting location of the first complete minicell in the data packet;

determining a header integrity check code that is based on every identified first guess minicell header;

identifying a stored header integrity check trailer code from the data packet;

comparing the determined header integrity check code with the stored header integrity check trailer code; and using a result of the comparison to determine whether the system is correctly aligned with the minicells in the data packet.

6. The method of claim 5, further comprising the steps of:

predicting a new starting location for the first complete minicell in the data packet if the result of the comparison between the determined header integrity check code and the stored header integrity check trailer code indicates the two codes are not the same;

identifying a second guess header from every minicell in the data packet based on the predicted new starting location of the first complete minicell in the data packet;

determining a new header integrity check code that is based on every identified second guess minicell header;

comparing the determined new header integrity check code with the stored header integrity check trailer code to generate a second result; and using the second result to determine whether the system is correctly aligned with the minicells in the data packet.

7. In a telecommunication system, an apparatus for generating a data packet comprising:

means for generating at least one minicell, wherein each minicell comprises a user data portion and a header;

means for inserting at least part of said at least one minicell into the data packet;

means for generating a header integrity check trailer code from a combination code, wherein the combination code comprises information contained in the header of each of the minicells that were inserted into the data packet; and means for inserting the header integrity check trailer code into the data packet.

8. The apparatus of claim 7, wherein said means for inserting the header integrity check trailer code into the data packet comprises:

means for inserting the header integrity check trailer code into a predetermined position in the data packet.

9. In a telecommunication system, an apparatus for determining the integrity of minicell headers in a data packet comprising:

means for identifying every minicell header in the data packet;

means for determining a header integrity check code that is based on every identified minicell header;

means for identifying a stored header integrity check trailer code from the data packet;

means for comparing the stored header integrity check code with the determined header integrity check trailer code; and means for using a result of the comparison to determine the integrity of every minicell header in the data packet.

10. The apparatus of claim 9, wherein said means for using a result from the comparison to determine the integrity of every minicell header in the data packet comprises:

means for detecting and correcting errors in at least one minicell header in the data packet.

11. In a telecommunication system, an apparatus for maintaining alignment of minicells in a data packet comprising:

means for defining a starting location for a first complete minicell in the data packet;

means for identifying a first guess header from every minicell in the data packet based on the defined starting location of the first complete minicell in the data packet;

means for determining a header integrity check code that is based on every identified first guess minicell header;

means for identifying a stored header integrity check trailer code from the data packet;

means for comparing the determined header integrity check code with the stored header integrity check trailer code; and means for using a result of the comparison to determine whether the telecommunication system is correctly aligned with the minicells in the data packet.

12. The apparatus of claim 11, further comprising:

means for predicting a new starting location for the first complete minicell in the data packet if the result of the comparison between the determined header integrity check code and the stored header integrity check trailer code indicates the two codes are not the same;

means for identifying a second guess header from every minicell in the data packet based on the predicted new starting location of the first complete minicell in the data packet;

means for determining a new header integrity check code that is based on every identified second guess minicell header;

means for comparing the determined new header integrity check code with the stored header integrity check trailer code to generate a second result; and means for using the second result to determine whether the system is correctly aligned with the minicells in the data packet.

13. The method of claim 5, wherein said step of defining a starting location for a first complete minicell in the data packet comprises the step of:

updating a minicell pointer maintained at a receiver in the telecommunications system, wherein the minicell pointer specifies which octet in the data packet corresponds to the starting location of the first complete minicell.

14. The apparatus of claim 11, wherein said means for defining a starting location for a first complete minicell in the data packet comprises:

a minicell pointer located in a receiver in the telecommunications system, wherein the minicell pointer specifies which octet in the data packet corresponds to the starting location of the first complete minicell.

* * * * *